United States Patent [19]

Hoff, Jr. et al.

[11] 3,821,715

[45] June 28, 1974

[54] MEMORY SYSTEM FOR A MULTI-CHIP DIGITAL COMPUTER

[75] Inventors: Marcian Edward Hoff, Jr., Santa Clara; Stanley Mazor, Sunnyvale; Federico Faggin, Cupertino, all of Calif.

[73] Assignee: Intel Corporation, Santa Clara, Calif.

[22] Filed: Jan. 22, 1973

[21] Appl. No.: 325,511

[52] U.S. Cl. ..... 340/172.5, 340/173 R, 340/173 SP, 307/238

[51] Int. Cl. ........................ G06f 13/00, G11c 11/44

[58] Field of Search ....... 340/172.5, 173 SP, 173 R; 307/238, 279

[56] References Cited

UNITED STATES PATENTS

| | | | |
|---|---|---|---|
| 3,460,094 | 8/1969 | Pryor | 340/172.5 |
| 3,641,511 | 2/1972 | Cricchi et al. | 307/238 X |
| 3,680,061 | 7/1972 | Arbab et al. | 340/173 R |
| 3,681,763 | 8/1972 | Meade et al. | 340/173 R |
| 3,685,020 | 8/1972 | Meade | 340/172.5 |
| 3,702,988 | 11/1972 | Haney et al. | 340/172.5 |
| 3,719,932 | 3/1973 | Cappon | 340/173 R |
| 3,731,285 | 5/1973 | Bell | 340/172.5 |
| 3,735,368 | 5/1973 | Beausoleil | 340/173 R |
| 3,737,866 | 6/1953 | Gruner | 340/172.5 |
| 3,740,723 | 6/1973 | Beausoleil et al. | 340/172.5 |

OTHER PUBLICATIONS

Schuenemann, "Computer Control" in IBM Technical Disclosure Bulletin, Vol. 14, No. 12, May 1972; pp. 3794–3795.

*Primary Examiner*—Paul J. Henon
*Assistant Examiner*—Melvin B. Chapnick
*Attorney, Agent, or Firm*—Spensley, Horn & Lubitz

[57] ABSTRACT

A general purpose digital computer which comprises a plurality of metal-oxide-semiconductor (MOS) chips. Random-access-memories (RAM) and read-only-memories (ROM) used as part of the computer are coupled to common bi-directional data buses to a central processing unit (CPU) with each memory including decoding circuitry to determine which of the plurality of memory chips is being addressed by the CPU. The computer is fabricated using chips mounted on standard 16 pin dual in-line packages allowing additional memory chips to be added to the computer.

17 Claims, 5 Drawing Figures

MEMORY SYSTEM FOR A MULTI-CHIP DIGITAL COMPUTER

BACKGROUND OF THE INVENTION

1. Field of the Invention

The invention relates to the field of digital computers.

2. Prior Art

Since their inception, digital computer applications have evolved from calculations through data processing and into the area of control. In recent years, with the development of the so-called "mini computer," applications, particularly in the control area, have greatly increased. Mini computers today are used at the heart of many systems since they are more flexible, can be easily personalized for a particular application, can be more readily changed or updated than fixed logic design systems, and, most significantly, the cost of such computers is much less than the cost of a large general purpose digital computer. Unfortunately, the size and cost of even the smallest mini computers has limited their use to relatively large and costly systems. Because of this, many smaller systems are fabricated with complex hardwired logic circuits.

The present invention provides a general purpose digital computer which may be fabricated for a cost considerably less than the cost of even the smallest mini-computers. As will be seen, the presently disclosed computer can provide the same arithmetic control and computing functions as a mini-computer with a few MOS chips with these chips being housed in standard packages. With the presently disclosed computer, it is anticipated that entire new applications, untapped because of the cost of mini-computers, will become practical. These applications include control functions, such as numeric controls, elevator control, highway and rail traffic control, and process control. The disclosed computer can be used as computer peripheral equipment to control displays, keyboards, printers, readers, plotters and terminals. Other applications for the presently disclosed system include computing systems and countless other applications within the fields of transportation, automotive uses, medical electronics and testing systems.

SUMMARY OF THE INVENTION

A general purpose digital computer which compriss a plurality of separate MOS chips is described. The chips are interconnected by a number of lines, including four bi-directional data bus lines. One chip includes a central processing unit that is coupled by the bi-directional lines to a plurality of memory chips which include random-access-memories (RAM) and read-only-memories (ROM). The ROMs are used to store the computer instructions and other data. A plurality of separate RAMs and ROMs may be added to the bi-directional lines. The memory chips each include decoding circuitry for recognizing a predetermined code, thus permitting the central processing unit to address a single one of the plurality of memory chips even though all the memory chips are coupled to the common data bus lines. In the presently preferred embodiment, each of the chips are mounted on standard 16 pin dual in-line packages and input and output information to the computer is read in through and read out from terminals on the memory chips.

DETAILED DESCRIPTION OF THE INVENTION

Figure 1:
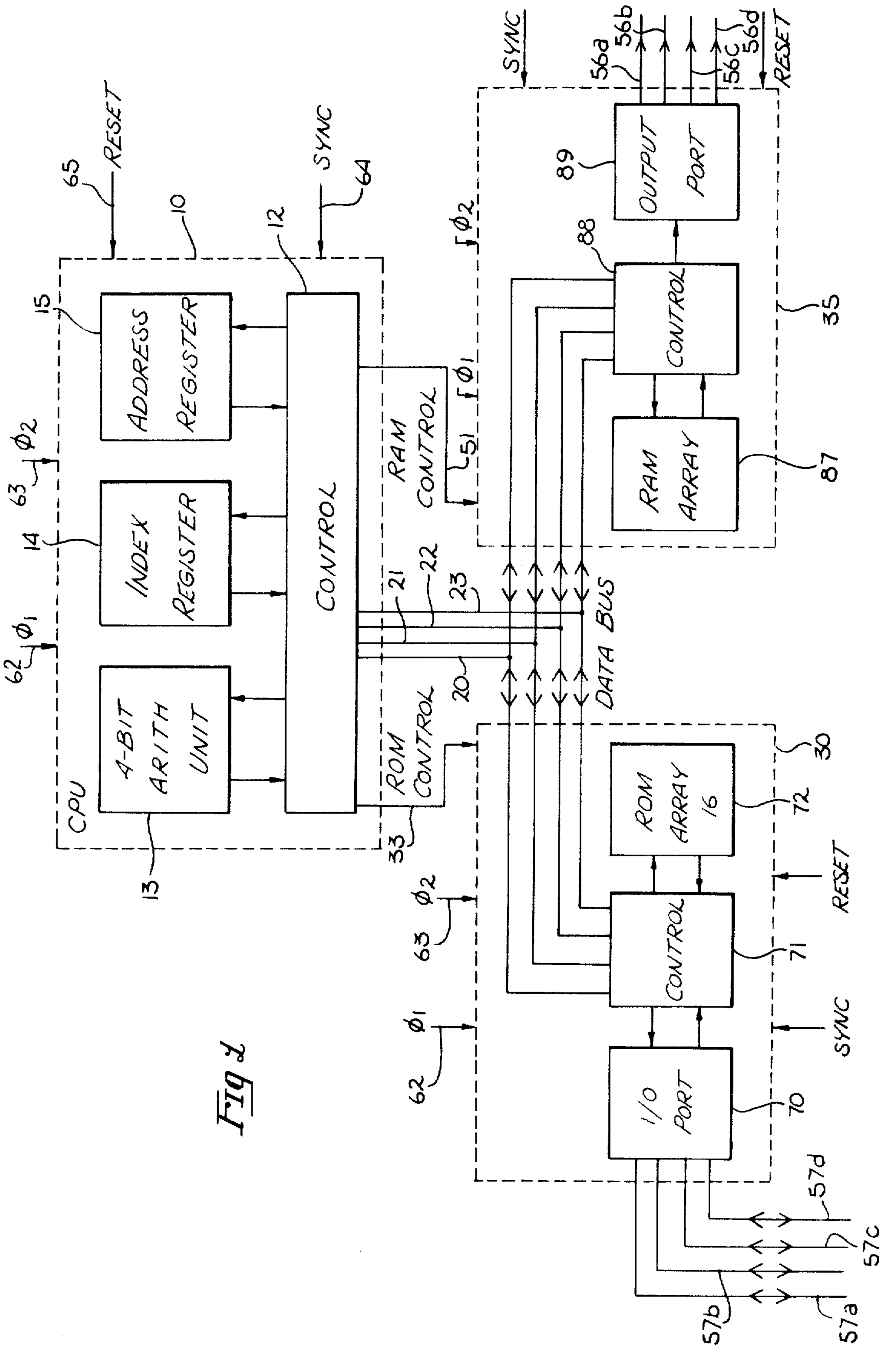
FIG. 1 is a general block diagram of the disclosed computer. It illustrates the central processing unit, a single RAM and a single ROM.

Referring first to FIG. 1, a computer built in accordance with the present invention is illustrated which includes a central processing unit or central processor 10, a random-access-memory (RAM) 35 and a read-only-memory (ROM) 30. In the presently preferred embodiment, four bi-directional data bus lines 20, 21, 22 and 23 are utilized to communicate information from the processor 10 to the memories and also to communicate information from the memories to the processor. Information may be read from the computer on lines 56*a*, 56*b*, 56*c* and 56*d* and information may be read into or from the computer on the input/output lines 57*a*, 57*b*, 57*c* and 57*d*. As will be explained in greater detail, the central processing unit or processor 10, the ROM 30 and the RAM 35, are each fabricated on separate MOS chips utilizing MOS technology and are interconnected by the various lines illustrated, including the common data bus lines 20, 21, 22 and 23. These bus lines may be fabricated on a printed circuit board along with lines 62, 63, 64, 65, 33 and 51, and then connected to the processor 10 and the memories 30 and 35 where appropriate. In the presently preferred embodiment the processor 10 and the memories 30 and 35 are packaged in dual in-line 16 pin packages as is commonly used in the semiconductor industry and, as will be seen, the pins on each package have been utilized such that the central processing unit is able to communicate with the memories and the entire computer is able to communicate through the ports provided on the memories with external circuitry.

While in FIG. 1 only a single ROM is illustrated, as will be explained in detail, numerous ROMs may be utilized and may be coupled to the common data bus lines 20, 21, 22 and 23. Additionally, a plurality of RAMs may be utilized and these memories would likewise be coupled to the common data bus lines 20, 21, 22 and 23. The central processor 10, as do the memories, receive complementary timing signals which may be externally generated, on leads 62 and 63 identified as $\phi_1$ and 100 $_2$, respectively, and illustrated in FIG. 2 as signals 66 and 67. Processor 10, in addition to developing other signals, develops a synchronization signal which comprises a pulse generated every eight periods of the signals $\phi_1$ and $\phi_2$. This synchronization pulse is illustrated as signal 68 in FIG. 2 and is communicated from the processor 10 to the various RAMs and ROMs utilized in the computer on lead 64. The central processor also generates a ROM control signal which is communicated to the ROMs utilized in the computer via lead 33 and a RAM control signal coupled to the RAMs utilized in the computer on lead 51. The purpose of these signals, including their function and use in the computer, will be described in more detail, particularly in conjunction with FIGS. 4 and 5.

The disclosed computer has been fabricated wherein each RAM and ROM and the processor are produced on separate chips utilizing MOS techniques. In the presently preferred embodiment P-channel silicon gate devices are utilized. For a general discussion on this particular technology, see IEEE Spectrum, October 1969, "Silicon-Gate Technology," page 28, by Vadasz, Moore, Grove and Rowe. The ROMs in the preferred embodiment are MOS memories wherein the contents of the memory are defined by masks used to fabricate the memories. Thus, the particular contents of the ROMs which includes the program and other data used by the computer, are defined by a mask. This has been found to be a relatively inexpensive method of producing the ROMs, particularly where the ROMs are made in production quantities. (As will be discussed, each ROM in the presently preferred embodiment includes a different decoding circuit which is likewise defined by the mask.) For experimental use, or where only a few ROMs are to be made, electrical programmable and erasable MOS ROMs may be utilized, using floating gate devices, such as those described in U.S. Letters Patent No. 3,660,819. The RAMs in the presently preferred embodiment comprise dynamic storage devices such as those disclosed in "MOS Random-Access-Memories," by Burton R. Tunzi, *Electronics*, Jan. 20, 1969, and "Silicon Gate Dynamic MOS Crams 1,024 Bits on a Chip," *Electronics*, Aug. 3, 1970, pages 68–73, by Marcian E. Hoff.

Figure 2:
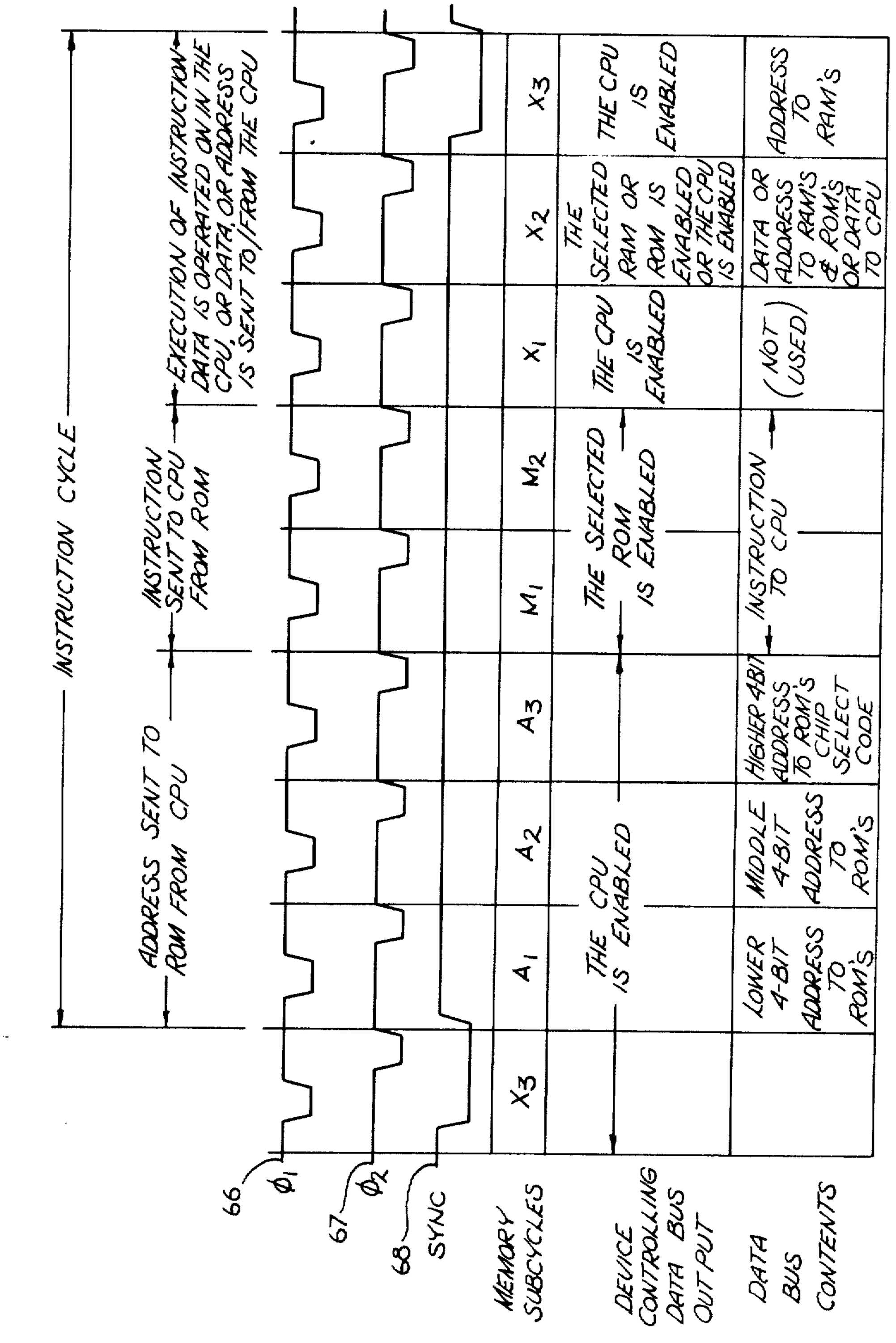
FIG. 2 is a graph illustrating a single instruction cycle of the computer and is used primarily to describe the manner in which the memories communicate with the central processing unit.

The processor 10 shown in FIGS. 1 and 2 may be fabricated using circuits used in many prior art central processing units utilized by digital computers. In the presently preferred embodiment the processor 10 which is fabricated on a single MOS chip includes a control unit 12, a four-bit arithmetic unit 13, an index register 14, and an address register 15. The four-bit arithmetic unit, index register and address stack all communicate with the control means 12 as is normally done in such units. The address register 15 includes a program counter, address stack and address incrementor. The address register is a dynamic RAM cell array of 4 by 12 bits. One level of this register is utilized to store the effective address and the other three levels are used as a stack for subroutine calls. The index register 14 includes a dynamic RAM cell array of sixteen by four bits and has two modes of operation. In one mode of operation the index register 14 provides 16 directly addressable storage locations for intermediate computation and control. In the second mode, the index register provides eight pairs of addressable storage locations for addressing the RAMs and ROMs, as well as for storing data fetched from the ROMs. The four-bit arithmetic unit 13 in the presently preferred embodiment is a four-bit adder of the ripple through carry type. The control means 12 of the processor 10 includes those circuits for performing the normal control functions associated with a central processing unit and also includes input and output buffers which permit communications to the lines 20, 21, 22 and 23, and circuit means for generating the synchronization signal illustrated in FIG. 2 as signal 68. The processor 10 which also generates a ROM control signal and a RAM control signal includes a reset flip-flop. It should be noted that during reset all RAMs and flip-flops located throughout the computer are cleared by a reset signal on lead 65. One unique aspect of the processor 10 as utilized in the presently preferred embodiment, is that the processor generates coded signals which are communicated to all the RAMs and ROMs on the common data bus lines 20, 21, 22 and 23. These coded signals, as will be explained, allow only the selected or addressed memory to perform a designated function.

The instruction repertoire of the processor includes 16 machine language instructions, 5 of which are of double length, 14 accumulated group instructions, and 15 input/output and RAM instructions. As will be appreciated, the particular instruction set utilized in the presently preferred embodiment may be changed and other instruction sets may be utilized by the disclosed computer.

Referring again to FIG. 1, the ROMs in the presently preferred embodiment include a memory array 72, a control unit 71, and input and output ports 70 which include the buffers required for these ports. The input and output ports 70, control 71 and the ROM array 72 are all included on a single chip. The RAM 35 includes a RAM array 87, a RAM control unit 88, and an output port 89 which includes the necessary buffers. The construction and operation of both the ROMs and RAMs will be discussed in more detail in conjunction with FIGS. 4 and 5, respectively.

Figure 3:
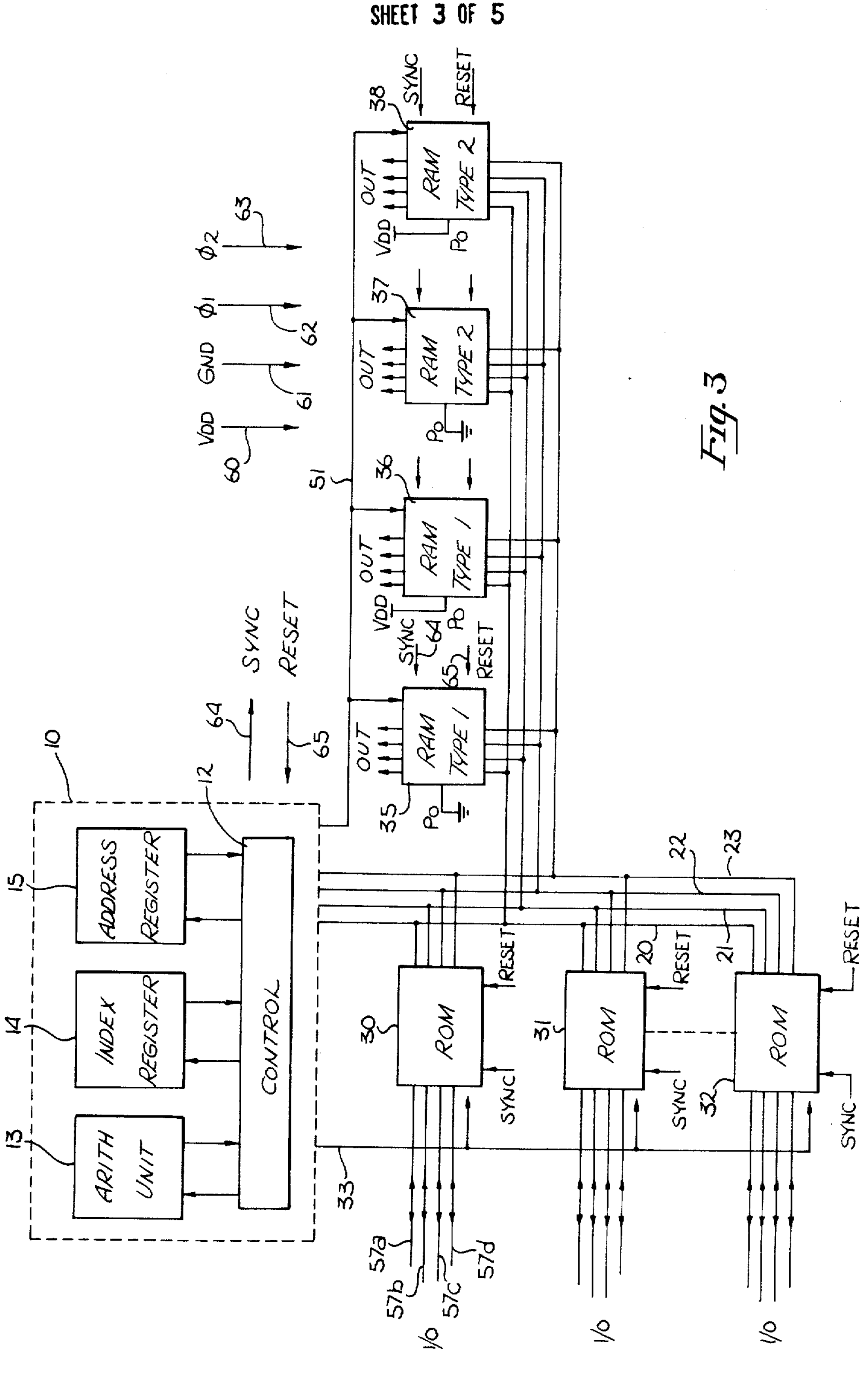
FIG. 3 is a block diagram illustrating the interconnections between the central processing unit and a plurality of memory chips including ROMs and RAMs.
Figure 4:
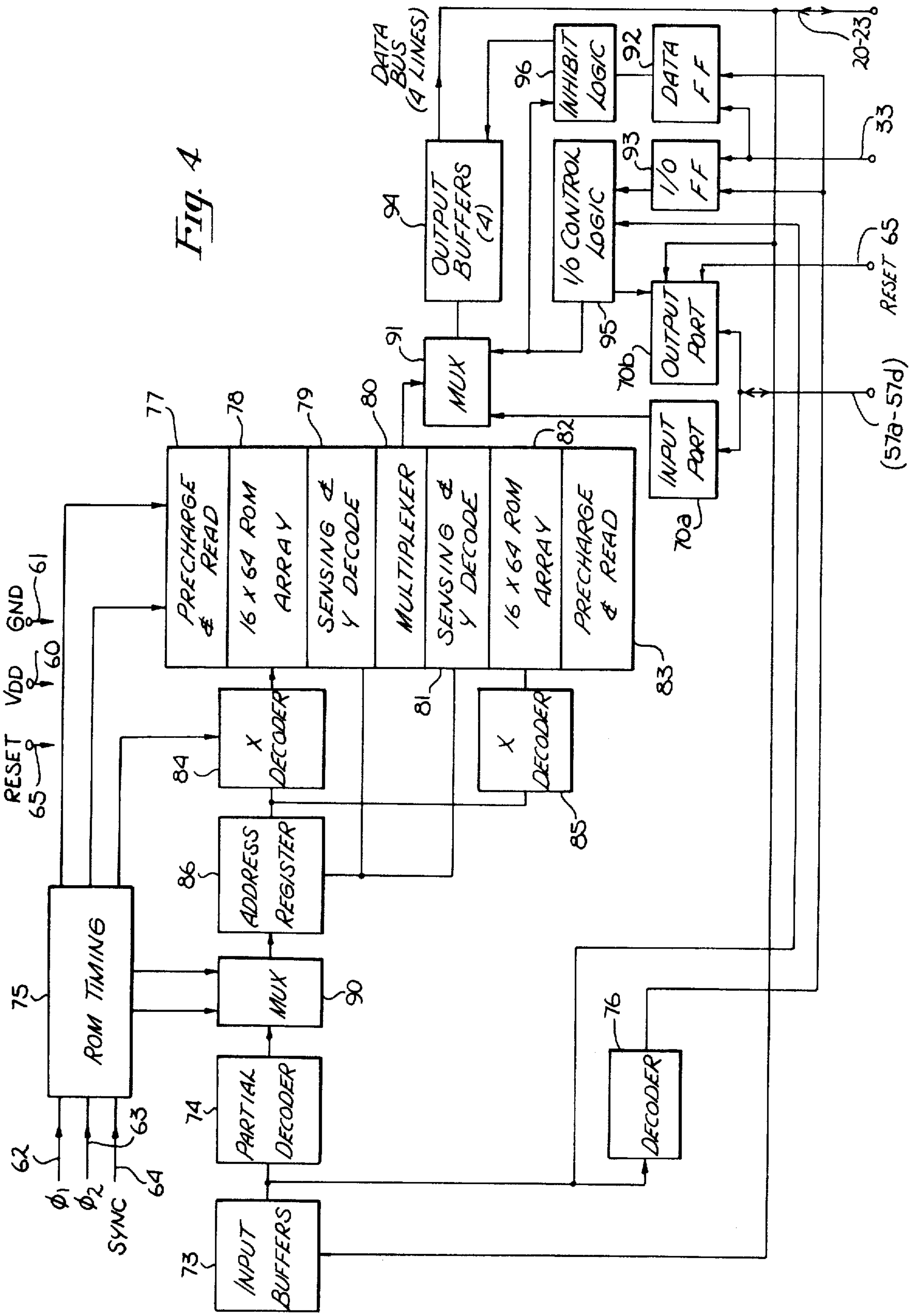
FIG. 4 is a detail block diagram illustrating a single ROM such as the ROMs illustrated in FIG. 3.

Referring to FIG. 4, a ROM utilized in the presently preferred embodiment is illustrated in block diagram form; this ROM may be similar to the ROMs utilized in the computer, such as ROMs 30, 31 and 32 illustrated in FIG. 3. The ROM of FIG. 4 may be built utilizing conventional ROM circuitry with the addition of circuitry for recognizing a predetermined code as will be explained. The control and timing for the ROM has not been illustrated in order to simplify the block diagram, but as in the case of other ROMs, appropriate ROM timing is generated from the $\phi_1$ and $\phi_2$ timing signals, leads 62 and 63, and from the synchronizing signal applied to the ROM on lead 64. In addition, a reset signal (lead 65) 65, a negative potential $V_{DD}$ (lead 60) and a ground line (lead 61) are also coupled to the ROM. The ROM timing is generated by means 75 but, as will be appreciated, other control signals will be required coupled to other components in the ROM as is customarily done for such memories.

The bi-directional data bus lines 20 through 23 are coupled to the input buffers 73 and the output buffers 94. The output of the input buffer 73 is coupled to a partial decoder 74 and to decoder 76. Referring to FIG. 2, during time $A_1$ and $A_2$, the eight bits (sent in two groups of four bits) required to access a location in the ROM, are sent to all the ROMs coupled to the bi-directional data bus lines 20 throuh 23. These eight bits, after being partially decoded by decoder 74, are then multiplexed to form a single eight-bit word within the multiplexer 90 before being transmitted to address register 86. As is customarily done in such ROMs, the eight bits are utilized by the X decoders 84 and 85 and by the Y decoders 79 and 81 for accessing a particular location within the 16 by 64 ROM arrays 78 and 82. The data stored in the selected portion of the ROM arrays is read from the multiplexer 80 into the multiplexer 91. In the presently preferred embodiment, as in most MOS ROMs, the information is read from the column lines in the array after the column lines have been precharged, this function being illustrated as precharge and read means 77 and 83. The multiplexer 80, upon receiving a stored eight-bit word from the array, communicates two four-bit words to the multiplexer 91. Thus, referring briefly to FIG. 3, during time $A_1$ and $A_2$, shown in the graph of FIG. 2, all the ROMs on lines 20 through 23 read stored data into a multiplexer 90.

After the CPU has communicated the address to all the ROMs during time $A_1$ and $A_2$, the CPU during time $A_3$ then communicates a chip select code, this being a four-bit coded signal which is used to activate only one of the ROMs located along the common data bus lines 20 through 23. During time $A_3$ the four-bit chip select code is communicated to decoder 76 (FIG. 4). The decoder 76 in each of the ROMs is different and is fabricated so as to identify only a single code. If this signal code is identified by the decoder, decoder 76 then communicates a signal to the data flip-flop 92 and to the input/output flip-flop 93. Any one of numerous prior art logic circuits may be utilized for decoder 76 as a means for identifying a predetermined four-bit signal. In the presently preferred embodiment, a plurality of AND gates are utilized within decoder 76. The circuit of each decoder 76 utilized in the computer is determined by a mask utilized to fabricate the ROM. It should be recognized that in such a computer each of the ROMs will include different stored information such as different programs or data and hence including a different decoder 76 in each of the ROMs is a relatively easy task.

If the decoder 76 has detected a code indicating that its chip has been selected by the processor 10 and if additionally a signal appears on lead 33, also provided by the processor 10, the data flip-flop 92 will be set. When the data flip-flop 92 is set inhibit logic means 96 does not send a signal to output buffer 94 and the information read from the ROM array is allowed to flow from the multiplexer 91 onto the data bus lines 20 through 23. Note that if the chip had not been selected and the data flip-flop 92 had not been set, inhibit logic means 96 would have prevented information from flowing from the unselected ROMs.

It is significant that the address used to locate a particular word in the ROM is communicated to the ROM prior to the time that the chip select code is communicated to the ROM. This is done so that all the ROMs will be decoding an address while the decoder 76 of each ROM is determining which chip has been selected, and hence, which ROM will be permitted to read two four-bit words onto the data bus lines 20 through 23 during times $M_1$ and $M_2$. This technique of accessing all the ROMs simultaneously before a single ROM has been selected saves time since a greater period of time is required to read data from the ROM array than to decode the four-bit chip select signal.

The ROM illustrated in FIG. 4 also enables the processor 10 to communicate with external circuitry shown as input/output lines 57*a* through 57*d*. These lines which are coupled to input port 70*a* and output port 70*b* are selectively coupled to the common data bus lines 20 through 23 through multiplexer 91 and the output buffers 94 upon receipt of appropriate signals from the input/output control logic means 95. The input/output control logic means is activated by the input/output flip-flop 93. This flip-flop is set if the decoder 76 detects the predetermined chip code during time $X_2$ and if a signal is present on lead 33 at $X_2$. When these conditions are met the input/output lines 57*a* through 57*d* are then coupled to the central processing unit or processor 10.

Referring to FIG. 3, a plurality of ROMs 30, 31 and 32 are illustrated coupled to the common data bus lines 20, 21, 22 and 23. In the presently preferred embodiment, as many as 16 ROMs may be utilized since the four-bit chip select code is able to activate any one of 16 ROMs. Note this number could be increased if additional command lines from the CPU are used, such as ROM control lead 33. Additionally, each of the ROMs may include input/output lines, allowing numerous external connections to the computer. Each of the ROMs, of course, are coupled to the line 33 and the lines 60, 61, 62, 63, 64 and 65.

Figure 5:
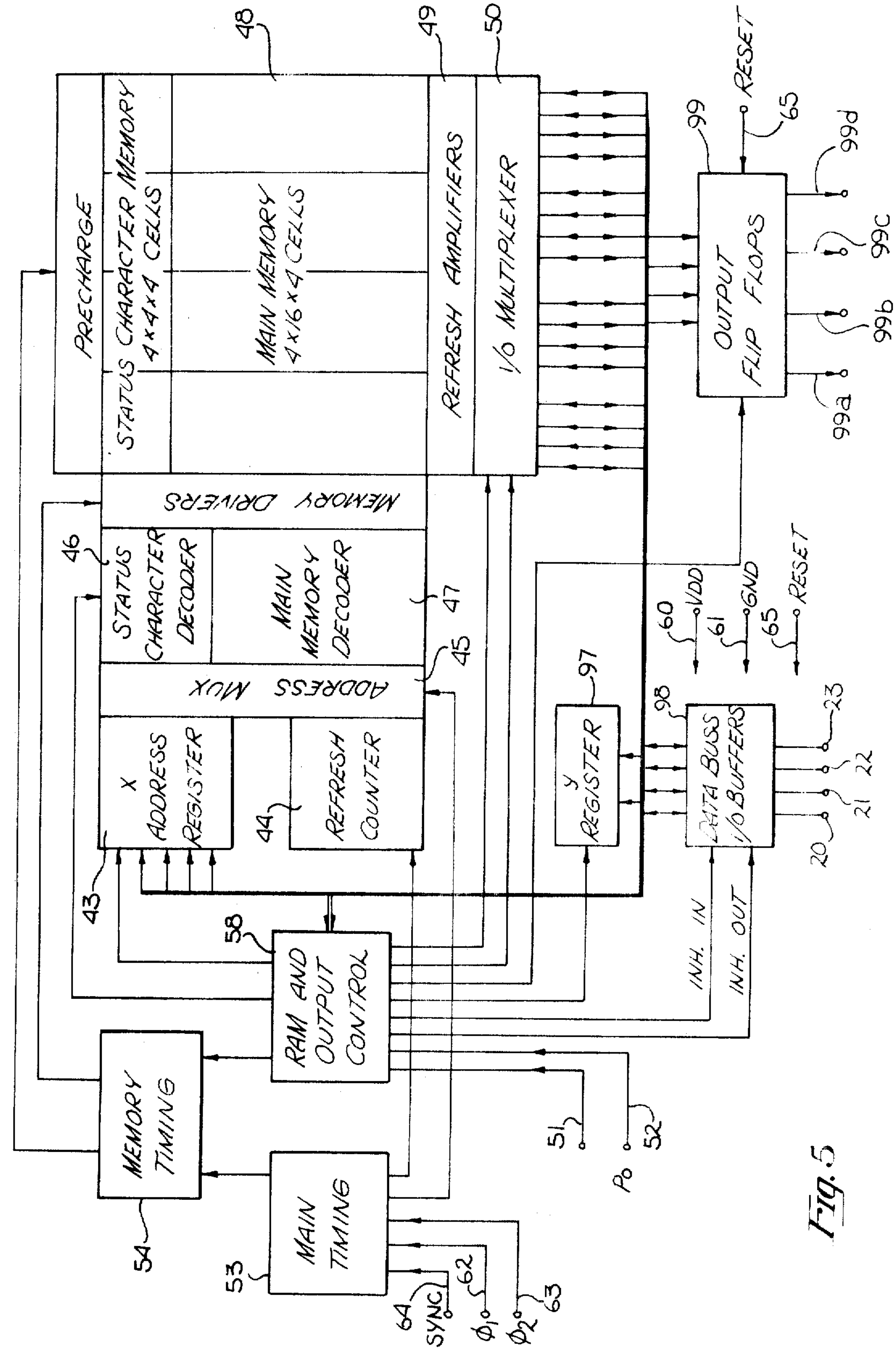
FIG. 5 is a detail block diagram of a single RAM such as the RAMs illustrated in FIG. 3.

Referring to FIG. 5, a RAM utilized in the computer, such as RAMs 35, 36, 37 and 38 shown in FIG. 3, is illustrated. The RAMs in the presently preferred embodiment perform two functions. First, they store 320 bits arranged in four registers of twenty four-bit characters each (16 main memory characters and four status characters) and additionally they provide a vehicle for communicating with peripheral devices through the output leads 99*a*, 99*b*, 99*c* and 99*d*.

The RAM may be fabricated from well-known prior art circuits utilized in such memories. In the presently preferred embodiment the common data bus lines 20 through 23 are coupled to data bus input/output buffers 98. The output from these buffers are coupled to the output flip-flops 99, the input/output multiplexer 50 of the memory array, to the X-address register 43 and the Y register 97. The memory in the presently preferred embodiment is a dynamic memory and hence requires refreshing; the refresh counter 44 determines the time during which the refreshing operation is to occur and at the appropriate time through the refresh amplifiers 49, all the data stored in the main memory and in the status character memory is refreshed. The X-address register 43 is coupled to the status character decoder 46 and the main memory decoder 47 through an address multiplexer 45. These decoders are coupled through memory drivers to the main memory and to the status character memory cells. The main memory 48 is coupled to the input/output multiplexer 50 allowing information to be read into and out of the memory through the multiplexer 50. The timing for the memory is provided through the signals $\phi_1$ and $\phi_2$, leads 62 and 63, respectively, and the synchronizing signal generated by the processor 10 and applied to the main timing means 53 via lead 64. The main timing means 53 is coupled to the RAM, the RAM and output control means 58 and the main memory timing means 54. The main memory timing means 54 generates the appropriate timing signals required by the status character decoder, memory drives and the precharge means as is customarily done in such memories. As will be explained in more detail, the RAM and output control means 58 provides signals to buffers 98 to enable the buffers to receive or transmit signals and also to the Y register 97 and the output flip-flops 99. The RAM and output control 58 is also utilized to control the input/output multiplexer 50, the X and Y registers and status character decoder 46.

The RAMs receive a reset signal on lead 65, a ground via lead 61 and a source of potential $V_{DD}$ on lead 60. A RAM control signal is coupled to each of the RAMs via lead 51. This signal is generated by the processor 10 and, as will be explained, a fixed predetermined potential is applied to lead 52 (terminal $P_0$) of each of the RAMs, this potential being either $V_{DD}$ or ground.

As was the case with the ROMs, all the RAMs, such as RAMs 35, 36, 37 and 38, are coupled to the common bi-directional data bus lines 20, 21, 22 and 23. Thus, each of the RAMs includes decoding circuitry for determining which RAM has been selected by the processor 10. In the case of the ROMs, since each ROM generally is programmed with different data, it is a relatively easy task to include unique chip selection circuitry, such as decoder 76 of FIG. 4, with each ROM. In the case of RAMs, since no programming is required during fabrication, each RAM may be identical, hence permitting the same RAM to be fabricated on a large production bases. Thus, it is somewhat impractical to include a different decoding circuitry with each RAM, such as is done with the ROMs. In the presently preferred embodiment, the RAMs are fabricated with two different chip select or decoding circuitry. This circuitry is included within control 58 and is illustrated in FIG. 3 as RAM type 1 and RAM type 2. With two different types of RAMs, that is, each possessing a different permanent logic circuitry, such as one RAM recognizing a "one" while the other recognizes a "zero," it is possible to utilize two RAMs, one of type 1 and one of type 2 on the common data bus lines 20 through 23.

The chip select or decoding circuitry of each of the RAMs is also coupled to a terminal $P_0$. The signal applied to lead $P_0$ which is either ground or $V_{DD}$, is utilized by the circuitry as part of the code which the circuit recognizes. Therefore, by coupling $P_0$ of a type 1 RAM to ground, and by coupling $P_0$ of a type 1 RAM to $V_{DD}$ and likewise by coupling the $P_0$ terminals of two type 2 RAMs to ground and $V_{DD}$, as is illustrated in FIG. 3, four RAMs may be coupled to the common data bus lines 20 through 23 and the processor 10 will be able to select one of the four RAMs. As was the case with the ROMs, the chip select or decoding circuitry may be fabricated from well known logic components, such as AND gates.

In the presently preferred embodiment, since only four RAMs are coupled to the common data bus lines, only two bits are required in order to select one of the four RAMs. These two bits are transmitted to the RAMs during $X_2$ time. The remainder of the bits transmitted during $X_2$ time, and the four bits transmitted during $X_3$ time are utilized in conjunction with the command signal provided on lead 51 to give the RAM information as to which particular location in the RAM is to be utilized for subsequent read, write, or input/output operation.

In some embodiments of the present invention additional control leads from the CPU to the RAMs are utilized to allow accessing of a particular group of four RAMs. For example, if an additional four RAMs were to be utilized, an additional lead, such as lead 51 from the CPU, would be required in order to control access to the added four RAMs.

The RAM of FIG. 5 in the presently preferred embodiment is a dynamic storage device and hence requires refreshing. This refreshing is performed during the portion of the instruction cycle shown in FIG. 2 where the RAM is not communicating information to or from the common bus lines or lines **99*a* through 99*d*. For example, refreshing can occur during time $A_1$, $A_2$ or $A_3$ and this time may be readily determined by the main timing means which is utilized to control the refresh counter 44. By refreshing the RAM during the time when the RAMs are not actively communicating with the processor 10 or external circuits, the refreshing process does not interfere with the remainder of the computer operation. Refresh is accomplished over a period of several machine cycles. The refresh counter 44 (FIG. 5) selects one portion of the memory through use of address multiplexer 45** for refreshing during each instruction cycle. This counter is automatically advanced, by well known circuitry, during each instruction circuitry.

While in FIG. 2 the instruction cycle of the presently preferred embodiment is illustrated, it will be readily apparent to one of ordinary skill in the art that other instruction cycles may likewise be used.

Referring to FIG. 3, the computer in its entirety is illustrated with a plurality of ROMs, a plurality of RAMs and the central processing unit, processor 10. Note, all the RAMs and ROMs are coupled to the common bi-directional data bus lines 20, 21, 22 and 23. In the presently preferred embodiment each of the RAMs or ROMs and the processor 10 are fabricated on separate MOS chips and then mounted on separate 16 pin dual in-line packages. The interconnections between the packages are provided by a printed circuit board.

Thus, a digital computer has been disclosed which utilizes a plurality of separate MOS chips and which may be fabricated utilizing known technology, The computer provides a general purpose digital computer for a cost considerably less than prior art computers.

We claim:

1. A general purpose digital computer comprising:

a central processor disposed on a first semiconductor chip;

a plurality of bidirectional data bus lines;

at least a separate first and second semiconductor memory chip each defining a memory and each including a chip decoding circuit for recognizing a different predetermined code on said bidirectional data bus lines and for activating a portion of said memory upon receipt of said predetermined code, said data bus lines interconnecting said processor and said first and second memory chips for communicating said different predetermined codes from said processor to at least one of said first and second memory chips and for communicating data signals for one of said first and second memory chips to said processor;

whereby said processor may communicate signals to said first and second memory chips and said decoding circuits shall determine which memory is being addressed.

2. The computer defined in claim 1 wherein at least one of said first and second memory chips comprises a read-only-memory.

3. The computer defined in claim 1 wherein said processor includes circuit means for first communicating a signal representative of a location in one of said first and second memory chips and secondly communicates a coded signal which corresponds to said predetermined code recognized by one of said decoding circuits of said first and second memory chips.

4. The computer defined in claim 3 wherein said first memory chip comprises a read-only-memory and said second memory chip comprises a random-access-memory.

5. The computer defined in claim 4 wherein said random-access-memory comprises dynamic storage devices.

6. The computer defined in claim 5 wherein instructions for said computer are stored in said read-only-memory.

7. The computer defined in claim 5 wherein said random-access-memory includes means for refreshing said dynamic storage devices.

8. The computer defined in claim 7 wherein said refreshing means includes a counter for selecting a portion of said random-access-memory for refreshing.

9. The computer defined in claim 8 wherein said refreshing means includes means for advancing said counter.

10. The computer defined in claim 6 wherein the contents of said read-only-memory and said chip decoding circuit of said read-only-memory are defined by masks used to fabricate said read-only-memory.

11. The computer defined in claim 4 wherein said central processor communicates timing signals to said first and second memory chips, said timing signals defining a first period during which communications occur between said central processor and at least one of said first and second memory chips and a second period during which at least a portion of said random-access-memory is refreshed.

12. A digital computer comprising:

a first MOS chip which includes a central processor;

at least one MOS read-only-memory disposed on a second chip which includes a read-only-memory and chip recognition circuitry for recognizing a first predetermined coded signal and for enabling said memory chip to transmit a stored signal upon recognition of said first predetermined coded signal;

at least one MOS random-access-memory disposed on a third chip which includes a random-access-memory and chip recognition circuitry for recognizing a second predetermined coded signal and for enabling access to said random-access-memory upon recognition of said second predetermined coded signal;

a plurality of data lines interconnecting said central processor chip and said memory chips for communicating said first and second predetermined coded signals to said memories and for transmitting stored signals to and from said memories;

whereby said processor may selectively communicate with one of said memories.

13. A general purpose digital computer comprising:

an MOS central processing chip for performing central processing for said computer;

a plurality of MOS read-only-memory (ROM) chips, distinct from said processing chip, each including a read-only-memory for storing computer instructions and each ROM chip including a chip select code circuit for recognizing a different predetermined code and for enabling said ROM chips to transmit stored information upon recognition of its code such that no more than one of said plurality of ROM chips shall transmit stored information at any given time;

a plurality of MOS random-access-memory (RAM) chips distinct from said processing chip and said ROM chips, each including a random-access-memory for storing information and each RAM chip including a chip select code circuit for recognizing a different predetermined code and for enabling said RAM chips to be accessed upon recognition of its code such that no more than one of said plurality of RAM chips shall be accessed at any given time;

a plurality of common data lines each interconnecting said central processor, said ROM chips and said RAM chips for transmitting said different predetermined codes and for transmitting data from said memories to said processing chip;

whereby said central processor is able to communicate with only a selected one of said ROM chips and RAM chips on said common lines.

14. The computer defined in claim 13 wherein at least some of said RAM chips are coupled to a common line which provides a continuous signal which form a part of said predetermined code.

15. The computer defined in claim 13 wherein said RAM chips comprise dynamic storage devices.

16. The computer defined in claim 15, including four common data lines.

17. The computer defined in claim 13 wherein at least some of said ROM chips and RAM chips include ports for receiving input signals to said computer and for providing output signals from said computer.

* * * * *